United States Patent [19]

Reischle et al.

[11] Patent Number: 4,585,819

[45] Date of Patent: Apr. 29, 1986

[54] FUSION ADHESIVE WHICH CAN COMPRISE AN ISOCYANATE PREPOLYMER, A THERMOPLASTIC POLYMER AND/OR A LOWER MOLECULAR WEIGHT KETONE RESIN

[75] Inventors: Ferdinand Reischle; Jochen Windhoff; Walter Bernig, all of Munich, Fed. Rep. of Germany

[73] Assignee: H. B. Fuller Company, St. Paul, Minn.

[21] Appl. No.: 640,709

[22] Filed: Aug. 14, 1984

[51] Int. Cl.[4] ............................................. C08L 75/00
[52] U.S. Cl. ................................ 524/196; 427/388.1; 427/388.2; 427/389; 427/389.9; 427/391; 427/393; 427/393.5; 428/423.1; 428/423.3; 428/423.4; 428/423.9; 428/425.1; 428/425.8; 525/440; 525/457; 525/458
[58] Field of Search ............... 524/196; 525/440, 457, 525/458; 427/388.1, 388.2, 389, 389.9, 391, 393, 393.5; 428/423.1, 423.3, 423.4, 423.9, 425.1, 425.8

[56] References Cited

U.S. PATENT DOCUMENTS

| | | | |
|---|---|---|---|
| 2,432,148 | 12/1947 | Furness et al. | 260/43 |
| 3,108,083 | 10/1963 | Laganis | 260/14 |
| 3,267,063 | 8/1966 | Hudson | 260/33.8 |
| 3,437,622 | 4/1969 | Dahl | 260/24 |
| 3,509,232 | 4/1970 | Schollenberger | 260/858 |
| 3,671,301 | 6/1972 | Dahl | 117/122 |
| 3,829,533 | 8/1974 | Matsui et al. | 525/458 |
| 3,914,484 | 10/1975 | Creegan et al. | 428/42 |
| 3,931,077 | 1/1976 | Uchigaki et al. | 524/272 |
| 3,935,144 | 1/1976 | Hagenweiler et al. | 260/24 |
| 3,970,717 | 7/1976 | Muller-Albrecht et al. | 260/859 |
| 4,013,806 | 3/1977 | Volkert et al. | 427/54 |
| 4,021,391 | 5/1977 | Ijichi et al. | 260/27 |
| 4,066,600 | 1/1978 | Pletcher et al. | 260/30.6 |
| 4,165,307 | 8/1979 | Mizuno et al. | 260/40 |
| 4,205,018 | 5/1980 | Nagasawa et al. | 525/404 |
| 4,279,801 | 7/1981 | Kramer et al. | 260/40 |
| 4,352,858 | 10/1982 | Stanley | 525/458 |
| 4,390,678 | 6/1983 | LaBelle et al. | 528/60 |

FOREIGN PATENT DOCUMENTS 1077352 5/1980 Canada ............................. 117/195
1081705 8/1964 United Kingdom .

Primary Examiner—Maurice J. Welsh
Attorney, Agent, or Firm—Merchant, Gould, Smith, Edell, Welter & Schmidt

[57] ABSTRACT

The present invention relates to fusion adhesives characterized in that they comprise an isocyanate prepolymer, a thermoplastic polyurethane or polyester, and/or a lower molecular weight synthetic resin selected from the group consisting of ketone resins, hydrogenation products of acetophenone condensation resins, and mixtures thereof.

21 Claims, No Drawings

FUSION ADHESIVE WHICH CAN COMPRISE AN ISOCYANATE PREPOLYMER, A THERMOPLASTIC POLYMER AND/OR A LOWER MOLECULAR WEIGHT KETONE RESIN

Fusion adhesives are known. They consist of thermoplastic polymers which are in general modified with synthetic or natural resins, waxes, organic fillers etc. When heated to 100°–200° C. they liquefy. After application of the fusion adhesive on the substrates to be bonded, the adhesive rapidly solidifies and forms a solid bond.

The main advantages of fusion adhesives with respect to other adhesive systems are the rapid binding and the absence of water and solvents. The main drawback is their thermoplastic behaviour. At increased temperatures they become soft to liquid, but at low temperatures they become hard and brittle so that the adhesive bonds are only resistent in a more or less narrow temperature range.

The same applies also to known polyurethane fusion adhesives. They are costly and do not offer the advantages found with the adhesives based on ethylene vinyl acetae polymers, polyamides and polyterephthalic acid.

Polyurethane fusion products are highly viscous. At the necessary processing temperature their stability is poor. Starting resistance and heat resistance are low. They provide good bonding only on very few materials.

There are also known solvent-free wet-hardening NCO-prepolymers. At room temperature they are liquid or soft as wax. Due to the low starting resistance and the long reaction time their possible application is limited.

From DE-PS 24 01 320 are known fusion adhesives consisting of NCO-prepolymers which are combined with ethylene vinyl acetate, ethylene acrylate copolymers, atactic polypropylene and saturated thermoplastic polyesters such as for instance polyethylene terephtalate polymers as well as tackifying resins such as resin derivatives or terpenephenolic copolymers.

But said component containing compositions tend at certain composition ratios to make such fusion products incompatible or instable. In many cases their shelf life is not sufficient.

The present invention addresses the problems associated with the prior art and provides for compatible, fusion-stable and, in the absence of ambient humidity, storable fusion adhesives presenting a high initial bonding resistance and high thermostability.

Accordingly, the present invention provides for fusion adhesives comprising the following:
(a) 20 to 90% by weight isocyanate prepolymer, and
(b) 5 to 50% by weight of a lower molecular weight synthetic resin selected from a group consisting of ketone resins, hydrogenation products of acetophenone condensation resins, and mixtures thereof.

The composition may also comprise up to 75% by weight thermoplastic polyurethane.

Instead of thermoplastic polyurethane, the composition may comprise 10 to 70% by weight of a thermally stable or stabilized thermoplastic polyester preferably comprising an ester based on terephthalic acid, dicarboxylic acid and diols resulting in as few hydroxyl groups as possible in the polyester. When polyester is used, the composition of the fusion adhesive need not comprise lower molecular weight synthetic resin.

Not all polyesters are appropriate for the inventive fusion adhesives. Appropriate are such polyesters which comprise as few hydroxyl groups as possible. Polyester having a higher portion of hydroxyl groups results in highly viscous to unfusable products and therefore is not appropriate for fusion adhesives.

When using crystalline thermoplastic polyester instead of thermoplastic polyurethane there are rapidly obtained fast binding fusion adhesives having higher initial resistance.

Such fusion adhesives are particularly appropriate for bonding inorganic and organic substrates. But they are also similarly appropriate for bonding thermoplastic and thermosetting synthetic materials, foam materials, varnished surfaces, wood and wooden materials, paper, leather, synthetic leather, rubber, textiles, non-woven materials and metals.

A further subject matter of the invention relates to fusion adhesives consisting of a composition of
(a) 50 to 80% by weight isocyanate prepolymer,
(b) 0–2% by weight of a thermoplastic polyurethane or polyester, and
(c) 20–70% by weight of a lower molecular weight synthetic resin.

Due to their low viscosity such adhesive formulations are appropriate for spraying application and can advantageously be used for bonding foam materials or foam materials with non-woven materials, textiles, synthetic leather, leather, etc.

MANUFACTURE OF THE ISOCYANATE PREPOLYMER (A)

The reactive polyurethane prepolymers used in the inventive adhesive may consist of
1. aromatic diisocyantes such as 4.4'-diphenyl methane diisocyanate or cycloaliphatic diisocyanates such as for instance diisocyanato hexane or diisocyanatoisophoron or mixtures of said compounds and/or of
2. Prepolymers of the diisocyanates cited under 1. with short chain diols and end group primary or secondary OH-groups such as ethylene glycol to hexanediol 1.6, propylene glycol to hexapropylene glycol, or diethylene glycol to hexaethylene glycol, or of compositions of said compounds, and
3. linear or slightly branched polyesters with end-group primary or secondary OH-groups in the molecular weight range of 1,000–3,000, or with linear or slightly branched polyesters in the molecular weight range of 1,000–3,000, or polycaprolactodiols in the molecular weight range of 1,000–3,000, and of
4. short-chained diols with end-group primary or secondary OH-groups as cited under 2.

The reactive polyurethane prepolymer used in the inventive adhesive ranges within a viscosity range of about 50 Pa.s to about 40,000 Pa.s, in particular in the range of 5,000 to 40,000 Pa.s, at 20° C. for NCO % contents of about 1.0 to about 7.5%, in particular 2–5%.

The preparation is carried out in the following manner:

The diisocyanate and/or diisocyanate prepolymer are heated to 50°–70° C. and mixed with the desired amount of one of the polyol components indicated under A 3. One of the short-chained diols indicated under A 4 is then added, and the composition is maintained for 1–3 hours at 80° to 120° C.

The molar ratios of the components are the following:
1 mole of diisocyanate component 0.05–0.5 moles of polyol component
0.1–0.4 moles of short-chained diol component

PREPARATION EXAMPLE 410 g. of a diisocyanate prepolymer based on 4.4-diphenyl methane diisocyanate and tripropylene glycol (commercial product: Desmodur PF of Messrs. Bayer AG) are heated to 60° C. and then 516 g. of a polyester diol based on adipinic acid, ethylene glycol and butane diol 1.4 (molecular weight of about 2,000 and an OH number of about 55) are admixed under stirring and the mixture is heated to 90° C. Then 74 g. of tripropylene glycol are added drop by drop. Care must be taken that the temperature does not rise above 110° C. Said preparation is kept under stirring for 1½ hours at 110° C.
NCO: 2.7 to 3.2%.
Viscosity at 20° C.: 31,000 Pa.s (Brookfield HBT).

MANUFACTURE OF A THERMOPLASTIC POLYURETHANE (B)

The polyurethane used in the inventive adhesive consists of the following individual components:

1. Diisocyanates such as for instance 4.4'-diphenyl methane-diisocyanate, 2.4 toluol diisocyanate, 2.6 toluol-diisocyanate, isophorondiisocyanate, 1.6 diisocyanatohexane, and mixtures of said components, and
2. Polyols such as for instance linear or slightly branched polyesterdiols with end group primary OH-groups having a molecular weight of 1,000–3,000, linear or slightly branched polyethers with end group primary or secondary OH-groups having a molecular weight ranging from 1,000–3,000, or polycaprolactodiols having a molecular weight ranging from 1,000–3,000, and
3. short-chained diols with end group primary or secondary OH-groups such as for instance ethylene glycol to hexanediol 1.6, propylene glycol to hexapropylene glycol, diethylene glycol to hexaethylene glycol, and mixtures of said compounds.

The thermoplastic polyurethane used in the inventive adhesive therefore consists of one or several diisocyanate components cited under 1., one or several of the polyol components cited under 2., and additionally one or several of the short-chained diols cited under 3.

The molar ratios of the cited components may be as follows:
B 1. 1 mole of diisocyanate
B 2. 0.2–1.0 mole of longer chained diol
B 3. 0.8–0.0 mole of short-chained diol
the molar ratios of components B 1–B 3 being selected such that the thermoplastic polyurethane practically contains no more free OH- and NCO-groups.

At room temperature, thermoplastic polyurethane (B) is a solid block-shaped composition presenting high cohesion. The melting point is 70°–170° C., in particular 130°–135° C. The polyol component of the thermoplastic polyurethane (B) should be composed similarly to prepolymer (A) in order to obtain good compatibility with prepolymer (A) in all temperature ranges (from about −30° to +170° C.). The thermoplastic urethane (B) must not comprise any NCO-reactive groups in the molecule in order to ensure the storability of the hotmelt.

The thermoplastic polyurethane (B) provides the fusion adhesive with high resistance at room temperature. Furthermore, it is possible to adjust the melting or softening points and thereby the processing temperatures of the inventive fusion adhesive compositions due to the proportion of thermoplastic urethane (B) as desired.

In compliance with said proportion the surface of the fusion adhesive composition is slightly adhesive or blocking at room temperature.

PREPARATION EXAMPLE FOR A THERMOPLASTIC POLYURETHANE

| | |
|---|---|
| 404.0 g. | of polyester diol based on adipinic acid, butane diol 1.4 and ethylene glycol with an OH-number of about 55 and a molecular weight of about 2,000 |
| 20.0 g. | of butane diol 1.4 |
| 109.5 g. | of 4.4'-diisocyanatodiphenyl methane |
| 533.5 g. | |

The preparation is made as follows:
The 4.4-diisocyanatodiphenyl methane is heated to 50°–70° C. and mixed with the polyester diol. The mixture is heated with stirring to 80° C. while the butane diol 1.4 is added drop by drop.

The preparation is kept under stirring at 80° C. Thereby is obtained a solid white thermoplastic polyurethane having a melting point of 130° C.

The proportion of lower molecular weight synthetic resin (C) is provided for further modification of the characteristics of the fusion adhesive. The softening point should range from about 60° to 120° C. The resin has to be compatible with both main components of the inventive fusion adhesive and must not react with the isocyanate-groups of the prepolymer. The lower molecular weight synthetic resins permit control or modification of characteristics such as hottack, initial resistance and viscosity.

MANUFACTURE OF THE LOWER MOLECULAR WEIGHT SYNTHETIC RESIN (C)

The lower molecular weight synthetic resins are products which are generally prepared from:
(a) aliphatic ketones such as acetone or methyl ethyl ketone, aliphatic aromatic ketones such as acetophenone, methylnaphthyl ketone, propiophenone, or nucleus alkylized acetophenones such as methyl-, ethyl, tert. butyl and cyclohexanone or methylcyclohexanone, or mixtures thereof, under catalytic influence of neutral basic or acid condensation products, and/or
(b) ketones comprised of (a) and aldehydes such as for instance formaldehyde, acetaldehyde, propionaldehyde, butylaldehyde, crotonaldehyde, β-oxybutyraldehyde at molar ratios of ketones to aldehyde of 1:1 to 2:1.

The lower molecular weight synthetic resin may further be
(c) a hydrogenation product of acetonephenone condensation resins.

Synthetic resins as they may be used according to the invention are disclosed by
1. H. Wagner, H. F. Starx
   Lack-Kunstharze (4th ed. 1959)
   Karl Hanser, editors, Munich
   pages 79–83
2. Houben-Weyl, vol. XIV
   Part 2
   Georg Thieme editors, Stuttgart, 1963 pages 416–424.

With particular advantage is used a light neutral unsaponifiable ketone aldehyde condensation resin. Said resin has a density of about 1.19, an iodine colour number in a 50% toluol solution of about 1.5, an acid number of about 0.1 and a softening point of about 79° C.

According to the above citation (2) said synthetic resin may be manufactured from acetophenone and formaldehyde in a molar ratio of 1:1.

The inventive fusion adhesive comprising the above described components, remains stable and storable over a long period of time (more than 8 months) and is solid at room temperature.

Processing characteristics and binding behaviour substantially conform with usual fusion adhesives. Initial resistance is satisfactory to good. With progressing reaction of the NCO-groups with ambient humidity the binding resistance increases. The thermoplastic hotmelt film becomes more and more flexible and reaches an elastic final condition. The finished reacted fusion adhesive films are unmeltable, their elasticity and resistance are maintained in a broad temperature range. The latter as well as the bondings are resistant against fats, oils, softeners, diluted acids and lye solutions and are insoluble in most solvents and water. By varying the quantity ratios of prepolymer, thermoplastic polyurethane or polyester and lower molecular resin it is possible to vary processing and utilisation characteristics in the desired direction. The softening range (melting point), viscosity and processing temperature of the hotmelt depend on the molecular weight and composition of the prepolymer isocyanate (A), the thermoplastic polyurethane (B) or polyester and the melting point of the lower molecular weight synthetic resin (C).

The fusion viscosity of the fusion adhesive, measured at 150° C. with the Epprecht Rheomat 15 with viscotemp. ranges from about 0.1 to about 800 Pa.s.

The wetting velocity depends on construction and type of the isocyanate prepolymer (A) selected.

The polyisocyanate prepolymer (A) should be the main component of the inventive fusion adhesive. It conditions the high flexibility of the finished reacted film, the good resistance against cold and heat, high resistance against numerous agents such as solvents, fat etc. as well as excellent adhesion on many substrates.

When the proportion of prepolymer (A) drops below 20% by weight, the characteristics of the thermoplastic polymer or synthetic resin portion dominate. Heat and cold resistance are poorer. Resistance against softeners, fats and solvents decreases. At prepolymer (A) proportions of more than 90% by weight the prepolymer characteristics dominate. In this case the initial resistance of the incompletely reacted adhesive composition is very low and the film surface does not form a solid block. According to the invention the preferred proportions are 50 to 75% by weight of (A).

Even very low proportions of thermoplastic polyurethane (B) or ester influence the rheologic behaviour of the prepolymer fusion so that even on porous substrates it does not diffuse. This effect occurs already at proportions of 2% by weight of (B). It is an important characteristic of the thermoplastic polyurethane or polyester (B) that proportions in the range of 5–10% by weight may increase essentially the softening and melting point of the adhesive composition. The composition comprising the viscous to waxy prepolymers (A) becomes firm and the fusion rapidly solidifies. Thus is obtained the main requirement for hotmelts, i.e. to bind rapidly when cooling. With an increasing proportion of (B) fusion viscosity increases and thus the processing temperature of the adhesive composition increases and open time is shortened.

For adhesives requiring high initial resistances and for which penetration on porous materials is to be avoided, the thermoplastic polymer (B) is used in proportions ranging from 2–75% by weight, preferably 5–55% by weight.

If the application purpose requires low fusion viscosity of the adhesive the thermoplastic polymer (B) may either be left out completely or be used in proportions of less than 2%.

The proportion of lower molecular synthetic resin (C) improves the hottack, the wetting capacity and the binding velocity of the not cross-linked adhesive composition. In particular it causes a viscosity decrease. Consequently, there should be used at least 5% by weight of resin (C). At higher proportions than 50% by weight the utilization characteristics of the adhesive film become less good, for instance cold resistance and resistance against fat, softener and solvents, although cohesion and elasticity may still be sufficient. The proportions preferred according to the invention (component (C)) range between 10–40% by weight.

In the absence of humidity the inventive adhesive composition has good storing stability. Processing is carried out at temperatures ranging between 90° C. and 160° C. depending on the composition of the adhesive mixture and the temperature sensitivity of the substrate to be bonded.

For bonding thin synthetic films, for instance polyethylene films, there are preferably used low viscosity adjustments with low melting points (example 1, adhesive (a) which may be processed at temperatures ranging from 90° to 100° C. Conventional thermoplastic fusion adhesives with sufficient heat resistance necessitate substantially higher processing temperatures such that film damage may occur. For commercial fusion adhesives with low processing temperatures heat resistance of the bonding is poorer.

For bonding porous materials, or in cases in which the bonding is immediately stressed, high viscosity adjustments with higher softening or melting points are advantageous (example 2, adhesives (b) and (c)).

Processing of the fusion adhesive may be carried out with a wiper, rollers or spray devices. Particularly appropriate are drum melting installations.

The inventive fusion adhesives adheres to many organic or inorganic substrates, for instance to thermoplastic and thermosetting synthetic materials including foam materials, different varnishes, rubber, textiles, non-woven materials, leather, wood, metal and paper.

The following examples show the advantages of the crosslinked polyurethane fusion adhesive:

Structure of the adhesive compositions in % by weight:

|   |   | inventive examples | | | |
|---|---|---|---|---|---|
|   |   | a | b | c | d |
| A | prepolymer isocyanate accord. to example page 6 | 65 | 65 | 50 | 40 |
| B | thermoplastic polyurethane according to example page 7 | 5 | 20 | 30 | — |
| C | lower molecular weight synthetic resin (commercial ketone-aldehyde condensation product) according | 30 | 15 | 20 | 5 |

-continued

| | inventive examples | | | |
|---|---|---|---|---|
| | a | b | c | d |
| to example page 10 D polyester phthalic acid ester | — | — | — | 55 |

UTILISATION EXAMPLE 1

Bonding of polyethylene film

Pretreated low density polyethylene film (by corona pretreatment obtained surface tension: 45 dyn/cm) was coated with 20 g/m² of fusion adhesive. Application temperature: for fusion adhesive (a) about 90° C.; the conventional EVA based adhesive for synthetic materials necessitated an application temperature of 120° C. On the film coated with adhesive was applied within 10 seconds and pressed thereon a film section of the same dimensions. After 2 hours were cut therefrom the necessary test strips for determining separation, heat and cold resistance.

In table I the inventive fusion adhesive (a) has been compared to a specific conventional fusion EVA-based adhesive for synthetic materials.

TABLE I

| | inventive fusion adhesive[a] | state of art special fusion adhesive e for synthetic materials (ISATHERM S 39/3) |
|---|---|---|
| separation resistance of the coating | | |
| after 2 hours | 1.1 kp | 1.8 kp |
| after 24 hours | 1.8 kp | 1.9 kp |
| after 48 hours | 2.5 kp | 1.9 kp |
| after 1 week | film rupture (>3.2 kp) | 1.85 kp |
| heat resistance (after 4 days) at 50° C. | 3 mm after 24 hours | 1 min. |
| at 70° C. | 66 min | ½ min |
| cold resistance of bonding at −10° C. | no adhesion drop | breaks off |
| at −20° C. | no adhesion drop | breaks off |

Measuring methods

For determining separation resistance 15 mm large test strips bonded by the inventive adhesive were peeled off on a rupture machine.

Feed: 200 mm/min.

Heat resistance: 30 mm large bonded test strips were loaded in the air circulation oven at test temperature with a 300 g weight. The heat resistance was determined by measuring the time during which the test strip peels for 60 mm.

Cold resistance was verified manually. 30 mm large bonded test strips were stored at low temperatures for 1 hour in a coolant cabinet and then the test sample was loaded abruptly. It was registered whether the test strips delaminate in the bonding joint.

Cold rupture temperature: In a coolant cabinet a 10 mm thick, 100 mm large steel plate is set with its narrow edge on a panel. A 30 mm large, 600μ thick fusion adhesive film is fixed by adhesive tape in such a way that it rests for about half its length on the panel. The second half of the fusion adhesive film is bonded vertically to the part fixed on the panel onto the steel plate. After 1 hour the steel plate is pushed over so that the adhesive film is kinked. If the adhesive film does not break the temperature of the coolant cabinet is reduced by 2° and the procedure is repeated until the film breaks.

The viscosity of the fusion adhesive was measured by means of the Epprecht Theomat 15 plus Viskotemp.

UTILISATION EXAMPLE 2

Bonding of rigid substrates (wood).

Adhesives b, c and f were compared with a conventional fusion adhesive for binding furniture edges.

The test samples made of red beech were manufactured in the manner described in method WPS 68 for determining heat resistance of furniture fusion adhesives.

Shear strength was determined in compliance with DIN 53 254. Heat resistance was determined in compliance with WPS 68.

Failure load and resistance to rupture were determined by means of 600μ thick and 25 mm large adhesive films on a tearing machine. The gripping length of the films was 30 mm; the feed was 200 mm/min.

TABLE 2

| | inventive adhesive[b] | adhesive[c] | adhesive[d] | state of art adhesive[f] commercial furniture fusion adhesive (Rakoll K 570) |
|---|---|---|---|---|
| shear resistance of bonding | | | | |
| after 2 h | 10 kp/4 cm² | 23 kp/4 cm² | 99 kp/4 cm² | 64 kp/4 cm² |
| after 8 h | 38 kp/4 cm² | 203 kp/4 cm² | 155 kp/4 cm² | 68 kp/4 cm² |
| after 24 h | 207 kp/4 cm² | 213 kp/4 cm² | 202 kp/4 cm² | 69 kp/4 cm² |
| heating resistance of bonding: according to WPS 68: | | | | |
| after 2 h | 35–40° C. | 45–50° C. | 50–55° C. | 65–70° C. |
| after 24 h | 170–175° C. | 180–185° C. | 160–165° C. | 65–70° C. |
| after 48 h | 205–210° C. | 210–215° C. | 170–175° C. | 65–70° C. |

Tables I and 2 show that the bonding resistance of the inventive fusion adhesive is superior after complete crosslinking at ambient temperatures as well as at very high and low temperatures, as compared to conventional fusion adhesives.

Table 3 summarizes further physical characteristics.

TABLE 3

|  | a | b | c | e synth. fusion adh. | f furnit. fusion adh. | d |
|---|---|---|---|---|---|---|
| Viscosity |  |  |  |  |  |  |
| at 120° C. | 5 Pa · s | 100 Pa · s | 2000 Pa · s | 14.0 Pa · s | 1600 Pa · s | 3000 Pa · s |
| at 150° C. | 0.2 Pa · s | 9 Pa · s | 160 Pa · s | 4.5 Pa · s | 490 Pa · s | 900 Pa · s |
| melting p. |  |  |  |  |  |  |
| after 2 h | 67° C. | 90° C. | 92° C. | 68° C. | 100° C. | 115° |
| after 24 h | 110° C. | um[1] | um[1] |  |  | um[1] |
| after 48 h | um[1] | um[1] | um[1] |  |  | um[1] |
| failure load | 420% | 470% | 480% | 490% | 540% | 520% |
| tensile strength | 13.6 kp | 15.0 kp | 17.4 kp | 1.4 kp | 6.0 kp | 10.64 kp |
| cold fail. temp. | <−35° C.[2] | <−35° C.[2] | <−35° C.[2] | −15° | −28° C. | −35° C. |

[1] um — unmeltable
[2] The fusion adhesive films could not be tested at less than −35° C. The films of adhesives a, b and c are flexible at −35° C. The films of EVA resin adhesives d and e are brittle hard.

The cross-linked fusion adhesives are substantially resistant to solvents, oils, fats, softeners, diluted acids and lye solutions.

For instance, 14 day old bondings of PE films with adhesive (b) were stored in various solvents (storing time 5 weeks) and after 24 hours of ventilation of the solvents remaining in the bonding joint, the separation resistance was measured on a tension machine.

Width of test strips: 15 mm.
The following values were obtained:

| Solvent | separation resistance of PE-bondings after 5 weeks storage in the below indicated solvents |
|---|---|
| special gasoline | 3.2 kp/15 mm film rupture |
| toluol | 2.8 kp/15 mm film rupture |
| ethylacetate | 3.2 kp/15 mm film rupture |
| acetone | 2.9 kp/15 mm film rupture |
| trichlorethylene | 3.1 kp/15 mm film rupture |
|  | separation resistance of PE-bondings after 4 weeks storage in the below indicated media |
| dibutylphthalate | 2.8 kp/15 mm film rupture |
| dioctylphthalate | 2.9 kp/15 mm film rupture |
| aqueous sulfuric acid, 2n | 3.2 kp/15 mm film rupture |
| aqueous nitric acid, 2n | 3.2 kp/15 mm film rupture |
| aqueous potassium hydr., 2n | 3.2 kp/15 mm film rupture |
| water | 2.8 kp/15 mm film rupture |

Softener resistance:
Soft PVC film containing 30% of DOP was bonded with adhesive b and the special fusion adhesive d for synthetics.

The bonded strips were stored for four days at 50° C. in a drying oven and after cooling to room temperature the separation resistance was measured (width of test strips 30 mm).

The samples bonded with adhesive b gave results of 2.8 kp. The samples bonded with special adhesive (d) based on EVA-resins were delaminated. Due to absorption of softener from the PVC the adhesive became soft and smearing.

We claim:

1. A fusion adhesive which comprises 20–90 percent by weight isocyanate prepolymer, and 5–50 percent by weight lower molecular weight synthetic resin selected from the group consisting of ketone resins, hydrogenated products of acetophenone condensation resins, and mixtures thereof.

2. The fusion adhesive of claim 1 which further comprises up to 75 percent by weight thermoplastic polyurethane.

3. The fusion adhesive of claim 1 which further comprises 10 to 70 percent thermoplastic polyester.

4. The fusion adhesive of claim 1 which comprises 50–75 percent by weight isocyanate prepolymer, 10–40 percent by weight lower molecular weight synthetic resin, and which further comprises 5–55 percent by weight thermoplastic polymer selected from the group consisting of thermoplastic polyurethane, thermoplastic polyester, and mixtures thereof.

5. The fusion adhesive of claim 1 which comprises 50–80 percent by weight isocyanate prepolymer, 20–70 percent by weight lower molecular weight synthetic resin, and which further comprises up to 2 percent by weight thermoplastic polymer selected from the group consisting of thermoplastic polyurethanes, thermoplastic polyesters, and mixtures thereof.

6. A fusion adhesive which comprises 50–75 percent by weight isocyanate prepolymer, and 10–40 percent by weight lower molecular weight synthetic resin selected from the group consisting of ketone resins, hydrogenation products of acetophenone condensation resins, and mixtures thereof.

7. The fusion adhesive of claim 6 which further comprises up to 75 percent by weight thermoplastic polyurethane, and mixtures thereof.

8. A fusion adhesive which comprises 50–80 percent by weight isocyanate prepolymer, and 20–70 percent by weight lower molecular weight synthetic resin selected from the group consisting of ketone resins, hydrogenation products of acetophenone condensation resins, and mixtures thereof.

9. The fusion adhesive of claim 8 which further comprises up to 2 percent by weight thermoplastic polymer selected from the group consisting of thermoplastic polyurethanes, thermoplastic polyesters, and mixtures thereof.

10. A fusion adhesive which comprises 20–90 percent by weight isocyanate prepolymer and 10–70 percent by weight thermoplastic polyester.

11. The fusion adhesive of claim 10 which further comprises up to 50 percent of lower weight molecular weight synthetic resin selected from the group consisting of ketone resins, hydrogenation products of acetophenone condensation resins, and mixtures thereof.

12. A method of bonding substrates which comprises contacting a substrate with a bond-forming amount of a fusion adhesive comprising 20–90 percent by weight isocyanate prepolymer and 5–50 percent by weight lower molecular weight synthetic resin selected from the group consisting of ketone resins, hydrogenation products of acetophenone condensation resins, and mixtures thereof.

13. The method of claim 12 wherein the fusion adhesive further comprises 2–75 percent by weight thermoplastic polymer selected from the group consisting of thermoplastic polyurethanes, thermoplastic polyesters, and mixtures thereof.

14. The method of claim 12 wherein the fusion adhesive further comprises up to about 2 percent by weight of a thermoplastic polymer selected from the group consisting of thermoplastic polyurethanes, thermoplastic polyesters, and mixtures thereof.

15. The method of claim 12 wherein the substrate is selected from the group consisting of thermoplastic materials, thermosetting synthetics, foam material, varnished surfaces, wood and wooden material, paper, leather, synthetic leather, rubber, textiles, non-woven materials, and metals.

16. A method of bonding substrates which comprises placing a bond-forming amount of a fusion adhesive comprising 20–90 percent by weight isocyanate prepolymer, 0–50 percent by weight lower moleclar weight synthetic resin, and 10–70 percent by weight thermoplastic polyesters between a first substrate and a second substrate and contacting one of the first and second substrates with the other of the first and second substrates, wherein one of the first and second substrates comprises a foam material and the other of the first and second substrates comprises a material selected from the grop consisting of foam materials, non-woven materials and textiles.

17. The product of the method of claim 12.
18. The product of the method of claim 13.
19. The product of the method of claim 14.
20. The product of the method of claim 15.
21. The product of the method of claim 16.

* * * * *

UNITED STATES PATENT AND TRADEMARK OFFICE
CERTIFICATE OF CORRECTION

PATENT NO. : 4,585,819
DATED : April 29, 1986
INVENTOR(S) : Reischle et al

It is certified that error appears in the above-identified patent and that said Letters Patent is hereby corrected as shown below:

Column 1, Line 25, for "acetae" read --acetate--.
Column 2, Line 35, for "diisocyantes" read
                    --diisocyanates--.
Column 12, Line 16, for "grop" read --group--.

Signed and Sealed this

Second Day of September 1986

[SEAL]

Attest:

Attesting Officer

DONALD J. QUIGG

Commissioner of Patents and Trademarks